(12) United States Patent
Mizuta

(10) Patent No.: US 6,523,879 B2
(45) Date of Patent: Feb. 25, 2003

(54) FOUR-WHEELED UTILITY VEHICLE

(75) Inventor: Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/884,039

(22) Filed: Jun. 20, 2001

(65) Prior Publication Data

US 2001/0054832 A1 Dec. 27, 2001

(30) Foreign Application Priority Data

Jun. 21, 2000 (JP) ........................................ 2000-185657

(51) Int. Cl.[7] .................................................. B60N 3/02
(52) U.S. Cl. .......................... 296/71; 296/187; 296/205; 180/89.1; 280/DIG. 5
(58) Field of Search .......................... 296/1.1, 177, 186, 296/157, 205, 71; 280/DIG. 5; 180/89.1

(56) References Cited

U.S. PATENT DOCUMENTS

| RE28,876 | E | * | 6/1976 | Notestine et al. | ........... 280/756 |
|---|---|---|---|---|---|
| 4,072,339 | A | * | 2/1978 | Rothlislberger | .............. 105/354 |
| 5,094,316 | A | * | 3/1992 | Rosen | .......................... 181/141 |
| 6,293,616 | B1 | * | 9/2001 | Williams et al. | ........ 280/DIG. 5 |
| 2002/0024203 | A1 | * | 2/2002 | Takahashi | ................. 280/730.2 |

FOREIGN PATENT DOCUMENTS

JP          U 63-202579         12/1988

* cited by examiner

Primary Examiner—D. Glenn Dayoan
Assistant Examiner—Patricia Engle

(57) ABSTRACT

A four-wheeled utility vehicle has a driver's and passenger's compartment having open front and lateral sides, and an assist grip (32) that can be grasped by a passenger seated in a natural position on a passenger seat (4b). The assist grip (32) includes a core pipe (33) and an elastic coating member (31) coating the core pipe (33). The assist grip (32) is attached detachably to an upper part of an inclined front side part (21d) on the side of the passenger seat (4b) of a front frame member (21) of a cabin frame (5). The assist grip (32) protrudes toward the passenger seat (4b) to enable the passenger seated on the passenger seat (4b) to grasp the assist grip (32) easily.

8 Claims, 6 Drawing Sheets

FOUR-WHEELED UTILITY VEHICLE

BACKGROUND OF THE INVENTION

1. Field of the Invention

The present invention relates to a four-wheeled utility vehicle and, more particularly, to a four-wheeled utility vehicle having a cab provided with an assist grip, suitable for carrying cargoes in outdoor spaces or in wide indoor spaces, and provided with a cabin frame surrounding a driver's seat and a passenger seat and defining front and side openings.

2. Description of the Related Art

Referring to FIGS. 7(a) and 7(b) showing a prior art four-wheeled utility vehicle 100 disclosed in JP-U No. Sho 63-202579, the four-wheeled utility vehicle 100 has a body frame 101 of a metal, our wheels, i.e., two front wheels 102 and two rear wheels 103 suspended from the body frame 101, a driving unit, not shown, such as an engine, mounted on the body frame 101, a seat 104, i.e., a driver's seat and a passenger seat, load-carrying platform 105 and a steering wheel 108. The four-wheeled utility vehicle 100 is often provided with wide tires suitable for traveling on rough roads.

A cabin frame 106 is disposed in front of the load-carrying platform 105 so as to cover the front, rear, right and left sides of the seats 104.

The cabin frame 106 protects the driver and the passengers A roof or a canvas hood, not shown, can be attached to the cabin frame 106 to screen the seat 104 from rain and sunshine, and lighting devices 107 can be attached to the cabin frame 106 for illumination to facilitate night work.

When traveling in the four-wheeled utility vehicle 100 provided with the cabin frame 106, the driver seated on the driver's seat can remain seated stably on the driver's seat during travel on a rough road because the driver is able to hold on to the steering wheel 108. However, the four-wheeled utility vehicle is not provided with any thing like the steering wheel 108 that can be grasped by the passenger seated on the passenger seat. Therefore, the passenger seated on the passenger seat holds the passenger's body on the passenger seat by grasping a part of the cabin frame 106 or a guardrail disposed beside the passenger seat to remain securely seated on the passenger seat while the four-wheeled utility vehicle is traveling on a rough road. For example, a passenger 109 seated on the passenger seat grasps a horizontal upper member 106a of the cabin frame 106 by his hand 109a as shown in FIG. 8.

However, the passenger 109 needs to stretch out his hand 109a upward to grasp the upper member 106a and it is difficult for the passenger 109 seated on the passenger seat in a natural position to reach for the upper member 106a. The upper member 106a is one of the members of the cabin frame 106 and is usually a steel pipe of a large diameter. Therefore the upper member 106a is difficult to grasp. The guardrail 110 disposed beside the passenger seat is not necessarily positioned properly for grasping and is difficult for the passenger seated on the passenger seat in a natural position to grasp the guardrail 110.

SUMMARY OF THE INVENTION

The present invention has been made in view of the foregoing problems and it is therefore an object of the present invention to provide a four-wheeled utility vehicle provided with an assist grip that can be securely grasped by a passenger seated in a natural position on a passenger seat.

To achieve the object, a four-wheeled utility vehicle comprising: a seat including a driver's seat and a passenger seat; a load-carrying platform behind said seat; a cabin frame surrounding said seat and having open front and open lateral side; wherein the cabin frame is foxed by assembling pipes and has a front frame member set in front of the seat, having front side parts extending substantially vertically on right and left sides in front of the passenger cab, a rear frame member set behind the passenger cab and having rear side parts extending substantially vertically on right and left sides behind the seat, and an upper frame member interconnecting respective upper ends of the front and the rear frame member and an assist grip coated with an elastic coating member is attached to an upper part of the front side part on the side of the passenger seat of the front frame member so as to protrude toward a passenger seated on the passenger seat such that the passenger seated on the passenger seat is able to grasp the assist grip. The elastic coating member may be formed of rubber, a resin, sponge or the like.

The four-wheeled utility vehicle of the present invention has the assist grip attached to the upper part of the front side part of the front frame member of the cabin frame. Therefore, the passenger seated on the passenger seat is able to grasp the assist grip to remain securely seated on the passenger seat. The assist grip can be simply attached to the upper part of the substantially vertical front side part on the side of the passenger seat of the front frame member, the passenger does not need to stretch out his hand with an effort and the passenger seated in a natural position on the passenger seat is able to grasp the assist grip easily.

The elastic coating member coating the assist grip deforms elastically so as to conform to the size of the passenger's hand seated on the passenger seat and the passenger's manner of grasping, so that the passenger seated in a natural position on the passenger seat is able to have a firm grasp of the assist grip, to have a sensation of a firm grip and to feel stable.

Since the assist grip protrudes toward the passenger seat, the passenger seated on the passenger seat in a natural sitting position is able to grasp the assist grip. Thus, the passenger seated on the passenger seat is able to grasp the assist grip without making any physical effort and hence the passenger will not feel physical fatigue even it the passenger is seated on the passenger seat for a long time.

Desirably, the assist grip is attached detachably to the front frame section.

When the assist grip can be detachably attached to the front frame section, the assist grip and the cabin frame can be separately fabricated and the assist grip can be formed in a special shape conforming to the build of the passenger. The removal of the assist grip from the front frame section facilitates work for repairing or replacing the elastic coating member.

Preferably, the assist grip includes a core pipe of a metal having a main part and side parts extending from the opposite ends of the main part, respectively, at a fixed angle to the main part, and an elastic coating member coating at least the main part of the core pipe, a pair of brackets are fixed to the front side part of the front frame member of the cabin frame, and the side parts of the core pipe are fastened to the brackets with screws. In the foregoing description, "coating at least the main part" signifies a state where the elastic coating member coats at least the main part to be grasped by the passenger and may coat the main part and the side parts.

Thus, the assist grip has the rigid core pipe of a metal and the elastic coating member coating the core pipe and the side parts of the core pipe extending from the opposite ends of the main part at the fixed angle to the main part and fastened with screws to the brackets attached to the cabin frame. The passenger seated on the passenger seat is able to have a firm, secure grip of the assist grip. Since the core pipe and the elastic coating member are made separately and are combined, the assist grip can be easily manufactured. Since the assist grip is fastened to the brackets with the screws, the assist grip can be easily removed from the cabin frame.

BRIEF DESCRIPTION OF THE DRAWINGS

FIG. 5(*b*) is a sectional view taken on line A—A in FIG. 5(*a*);

FIG. 7(*b*) is a side elevation of four-wheeled utility vehicle shown in FIG. 7(*a*)

DESCRIPTION OF THE PREFERRED EMBODIMENTS

A four-wheeled utility vehicle in a preferred embodiment according to the present invention will be described with reference to the accompanying drawings.

Figure 1:
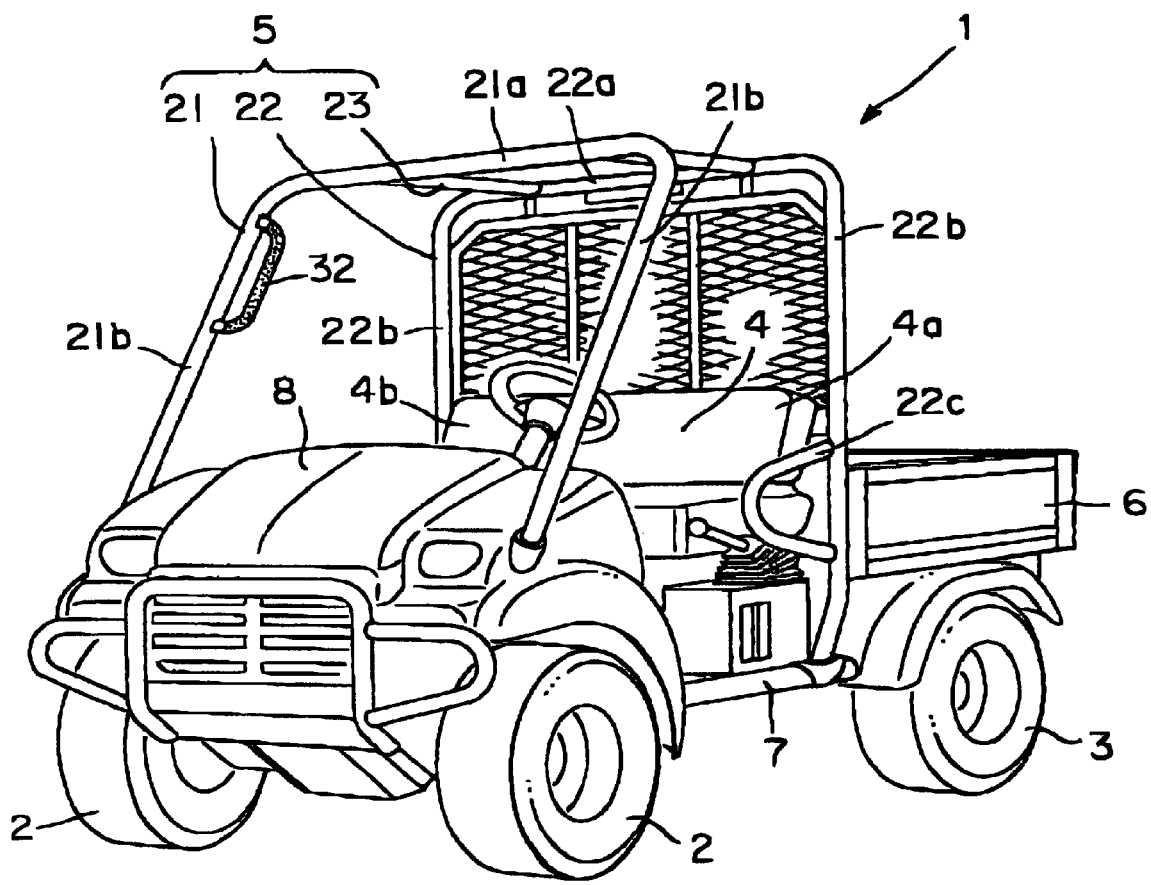
FIG. 1 is a perspective view of a four-wheeled utility vehicle in a preferred embodiment according to the present invention.
Figure 2:
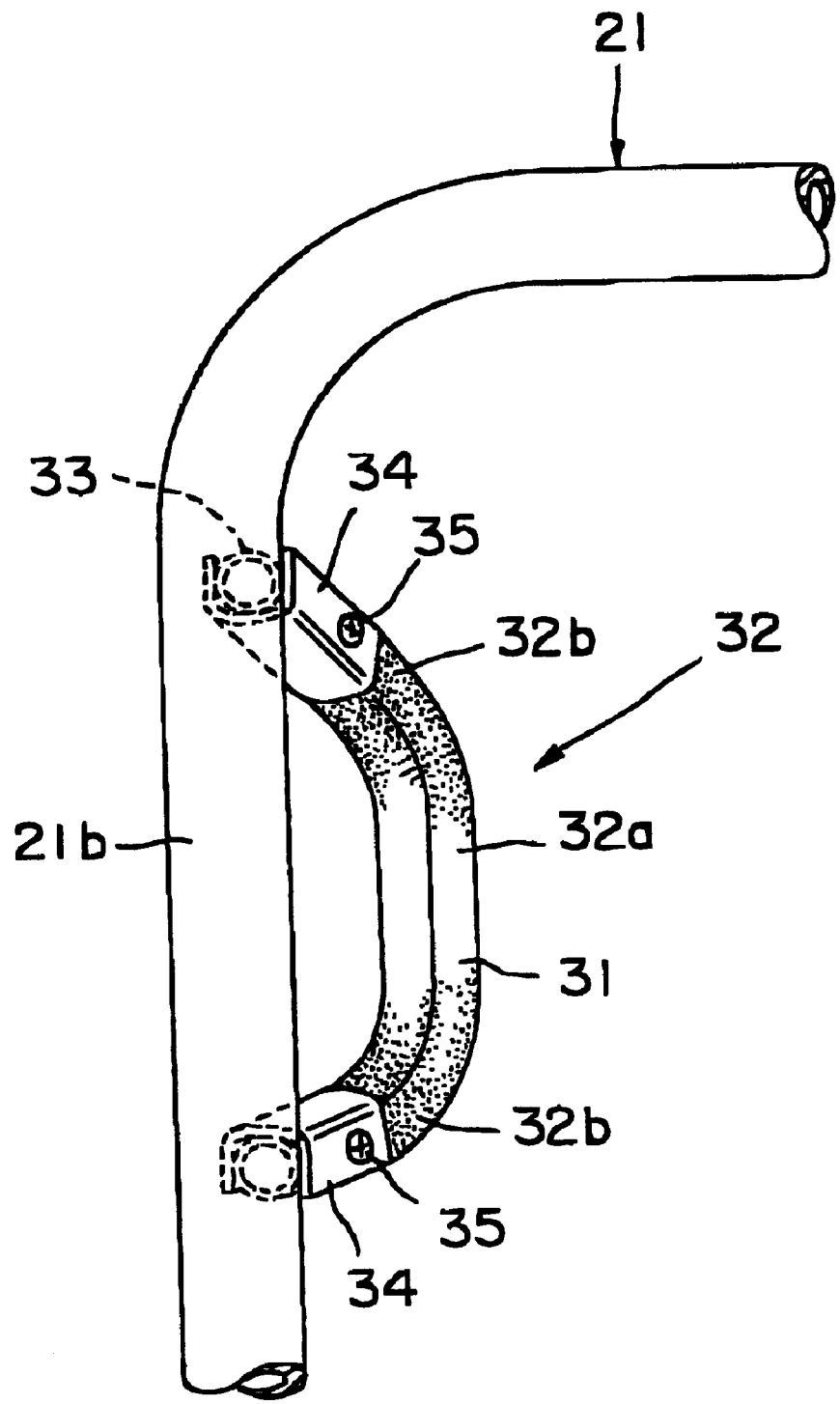
FIG. 2 is a front elevation of an assist grip included in the four-wheeled utility vehicle shown in FIG. 1.
Figure 3:
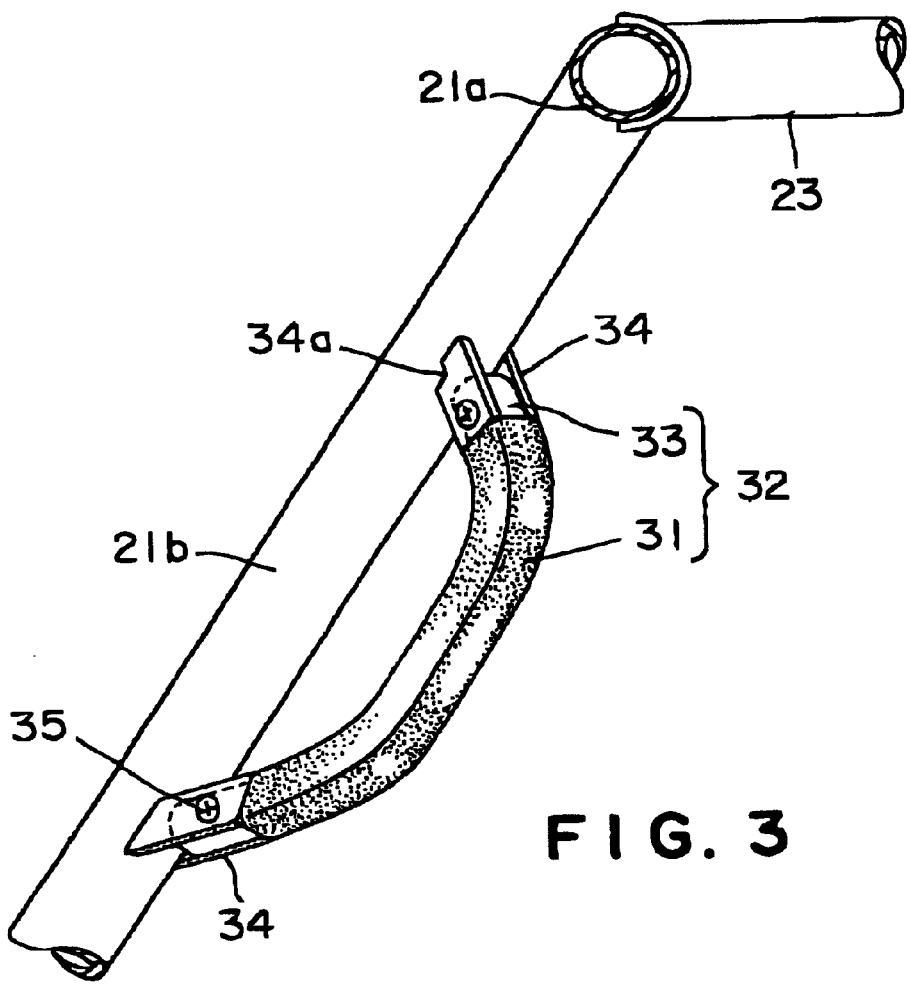
FIG. 3 is a side elevation of the assist grip shown in FIG. 2.
Figure 4:
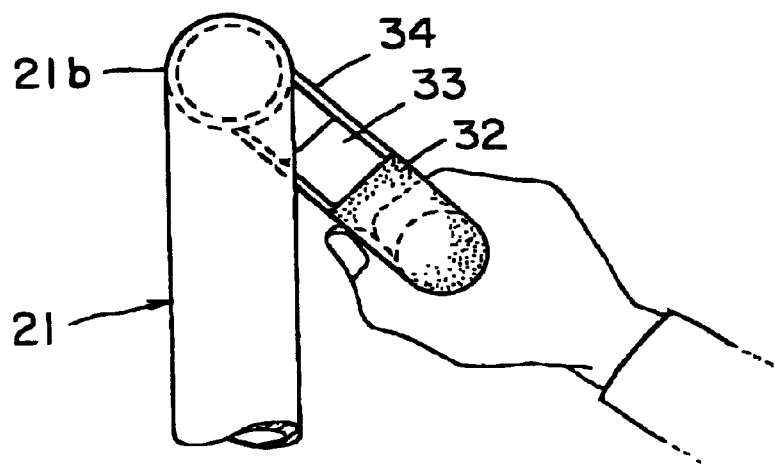
FIG. 4 is a top view of the assist grip shown in FIG. 2.
Figure 5A:
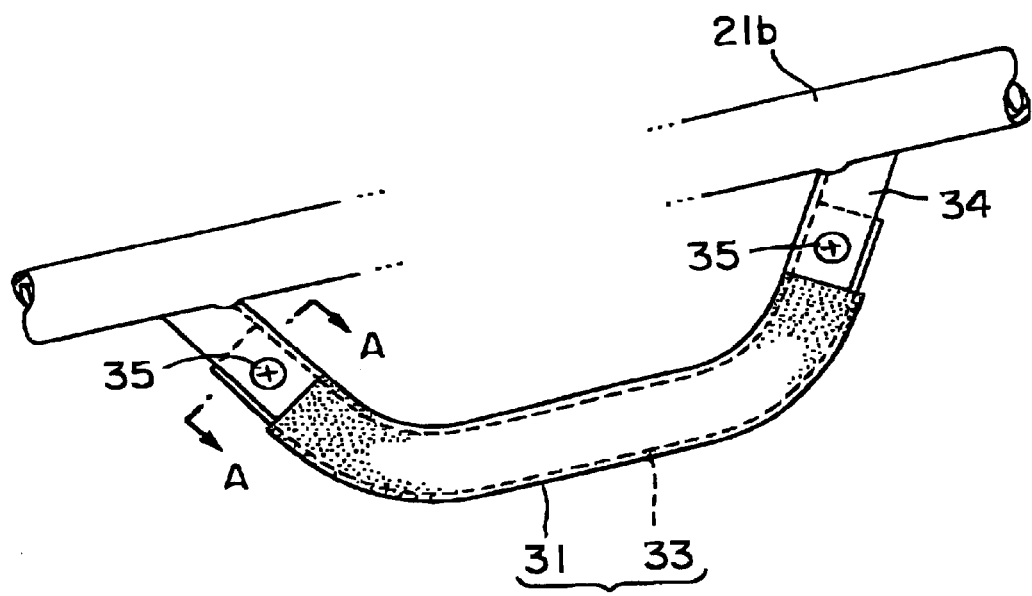
FIG. 5(*a*) is a view of assistance in explaining the relation between the assist grip shown in FIG. 2 and brackets attached to a cabin frame.
Figure 5B:
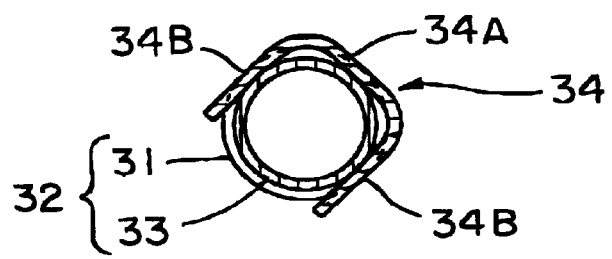

FIG. 1 is a perspective view of a four-wheeled utility vehicle in a preferred embodiment according to the present invention, FIGS. 2 to 4 are a front elevation, a side elevation, a top view, respectively, of an assist grip included in the four-wheeled utility vehicle shown in FIG. 1 and FIGS. 5(*a*) and 5(*b*) are a view of assistance in explaining the relation between the assist grip and brackets attached to a cabin frame and a sectional view taken on line A—A in FIG. 5(*a*), respectively.

Referring to FIG. 1, a four-wheeled utility vehicle 1 has front wheels 2, rear wheels 3, seat 4, i.e., a driver's seat 4*a* and a passenger seat 4*b*, a cabin frame 5, a load-carrying platform 6 and a steel body frame 7. The two front wheels 2 are suspended from front right and front left parts of the body frame 7, the two rear wheels 3 are suspended from rear right and rear left parts of the body frame 7, the seats 4 are disposed behind the front wheels 2 and the load-carrying platform 6 is disposed behind the seat 4. Generally, the utility vehicle is not provided with any side door beside the seat 4 and is not provided with any windshield because the maximum traveling speed, i.e., the upper limit of traveling ability, of the utility vehicle is low and the driver must be able to get on and off the utility vehicle easily for efficient work. Thus, the front and the right and the left side of the cabin frame 5 are open.

The cabin frame 5 surrounding the seat 4 has a front frame member 21 having front side parts 21*a* substantially vertically extending on the right and the left side of the front side of the seat (driver's and passenger compartment) 4, a rear frame member 22 having rear side parts 22*b* substantially vertically extending on the right and the left side of the rear side of the seat 4 and an upper frame member 23 interconnecting the respective upper parts of the front frame member 21 and the rear frame member 22. The cabin frame 5 protects a driver and a passenger seated on the seat 4. A roof or a canvas hood, not shown, can be attached to the cabin frame 5 to screen the seat 4 from rain and sunshine, and lighting devices are attached to the cabin frame 5 for illumination to facilitate night work. A hood 8 is supported openably on a front part of the body frame 7.

The load-carrying platform 6 is disposed behind the seat 4 so as to extend rearward from a position near the back of the seat 4 over and beyond the rear wheels 3. A drive unit, not shown, including an engine and a transmission is disposed under the load-carrying platform 6. The drive unit drives the rear wheels 3 if the four-wheeled utility vehicle is of a rear-drive type or drives the front wheels 2 and the rear wheels 3 if the four-wheeled utility vehicle is of a four-wheel-drive type. The front wheels 2 and the rear wheels 3 are provided with wide tires to enable the four-wheeled utility vehicle 1 to travel on rough roads. The load-carrying platform 6 is supported pivotally on a support shaft , not shown, disposed below a rear part thereof and can be turned on the support shaft relative to the body frame 7 to open the space under the load-carrying platform 6 for the maintenance of the engine, the transmission and the like disposed under the load-carrying platform 6.

The cabin frame 5 is constructed by welding together the frame members 21, 22 and 23 formed by bending steel pipes of a circular cross section. The front frame member 21 and the rear frame member 22 are formed separately, and a pair of pipes forming the upper frame member 23 interconnects the respective upper parts of the front frame member 21 and the rear frame member 22. The front frame member 21 is formed in a shape substantially resembling the inverted letter U and has a horizontal, lateral, front upper part 21*a* and a pair of front side parts 21*b* extending from the opposite ends of the front upper part 21*a*. The front side parts 21*b* of the front frame member 21 are sloped down toward the front. Lower end parts of the front side parts 21*b* extending on the outer sides of the hood 8 are fixed to the body frame 7. Similarly, the rear frame member 22 is formed in a shape substantially resembling the inverted letter U and has a horizontal upper part 22*a* and a pair of rear side parts 22*b* extending from the opposite ends of the upper part 22*a*. The rear side parts 22*b* of the rear frame member 22 are substantially vertical. Lower end parts of the rear side parts 22*b* are fixed to the body frame 7. A guardrail 22*c* is attached to the rear side part 22*b* of the rear frame member 22 on the level of a the seats 4.

An assist grip 32 is detachably attached to an upper part of the front side part 21*b* on the side of the passenger seat 4*b* of the front frame member 21 such that a passenger seated on the passenger seat 4*b* can grasp the assist grip 32.

Referring to FIGS. 2 to 5, the assist grip 32 has an elastic coating member 31 of rubber sponge or the like. The assist grip 32 is attached to an upper part of the inclined front side part 21*b* so as to protrude toward the passenger seat 4*b* to enable the passenger seated on the passenger seat 4*b* to grasp the assist grip 32 easily. Thus, a part to be grasped by the passenger of the assist grip 32 is on the inner side of parts attached to the cabin frame 5 of the assist grip 32. In this embodiment, the assist grip 32 is inclined toward the passenger seat 4b at an inclination of about 45° with respect to a vertical plane including the longitudinal axis of the four-wheeled utility vehicle 1. The inclination is not limited to 45° and may be an angle in the range of, for example, 5° to 60° selectively determined taking into consideration the shape of the cabin frame 5.

The assist grip 32 has a necessary rigidity. The assist grip 32 has a core pipe 33 formed by bending a metal pipe, such as an aluminum pipe, having a circular cross section of a diameter smaller than that of the steel pipes forming the cabin frame 5. The shape of the core pipe 33 defines the basic shape of the assist grip 32. The elastic coating member 31 is put on the core pipe 33 to form the assist grip 32. The assist grip 32 has a main part 32a that extends substantially in parallel to the front side part 21b of the front frame member 21, and end parts 32b extending away from each other from the opposite ends of the main part 32a at an angle to the main part 32a. The end parts 32b may be parallel to each other or may be extended toward each other from the opposite ends of the main part 32a. Parts of the core pipe 33 corresponding to the main part 32a and the end parts 32b of the assist grip 32 excluding end parts of the core pipe 33 are coated with the elastic coating member 31. The elastic coating member 31 is boned firmly to the core pipe 33 by an adhesive or the like so that the same may not turn on the core pipe 33.

A pair of brackets 34 is fixed to an upper part of the inclined front side part 21b on the side of the passenger seat 4b of the cabin frame 5. The pair of brackets 34 are spaced a distance corresponding to the distance between the end parts of the assist grip 32 apart. The end parts of the assist grip 32 are fastened to the brackets 34.

Figure 6:
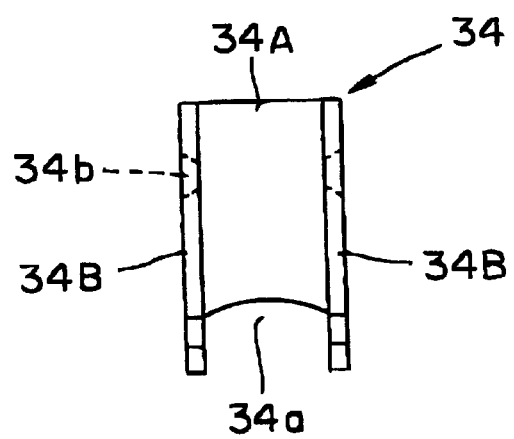
FIG. 6 is a front elevation of a bracket in accordance with the present invention.
Figure 7A:
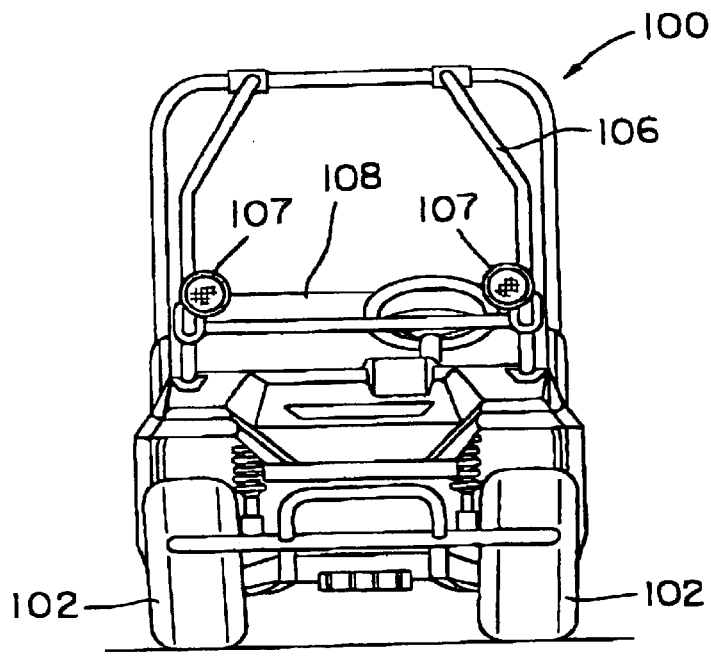
FIG. 7(*a*) is a front elevation of a conventional four-wheeled utility vehicle.
Figure 7B:
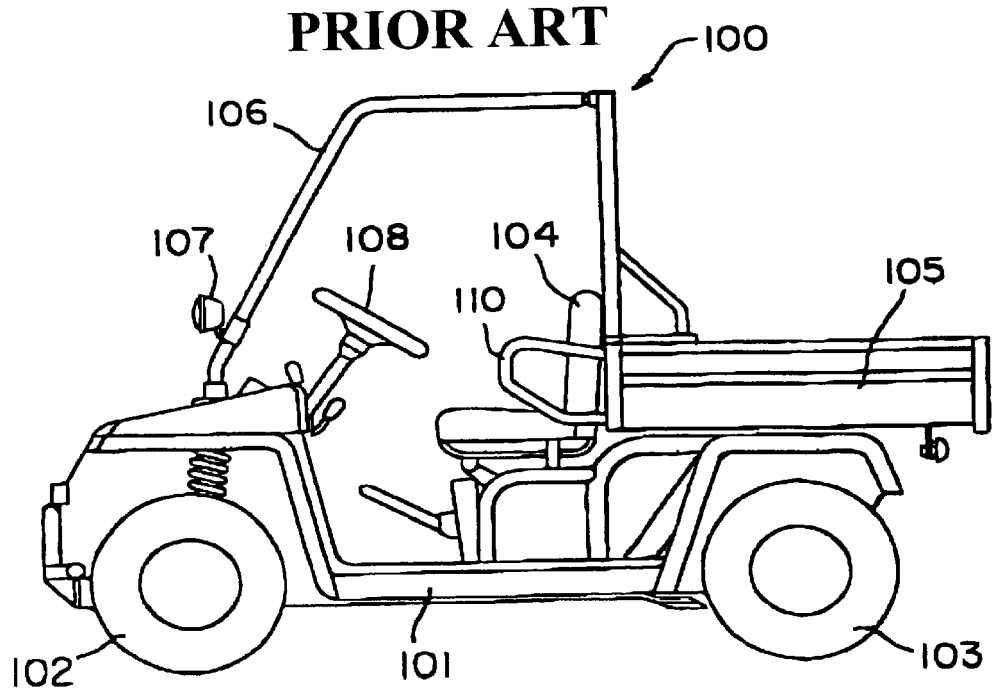
Figure 8:
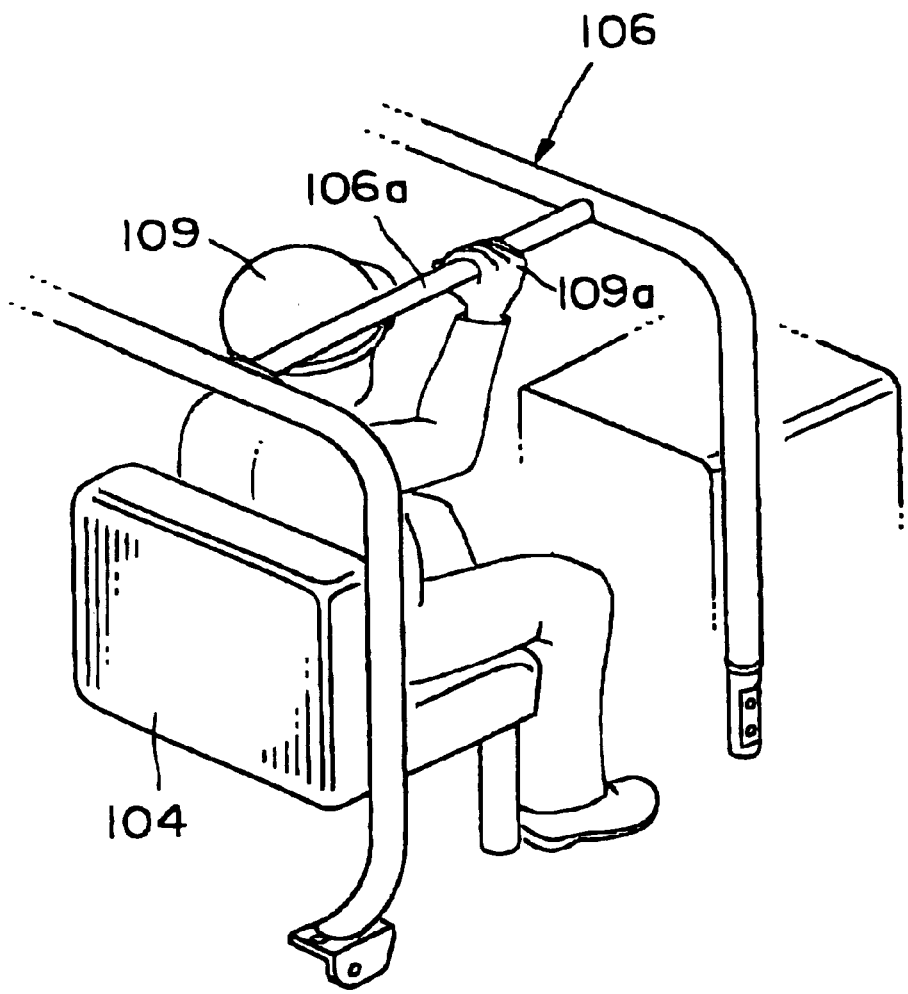
FIG. 8 is a view of assistance in explaining a seating condition of a passenger seated on a passenger seat of a conventional four-wheeled utility vehicle.

As show in FIG. 6 each bracket 34 has a base part 34A provided with a recess 34a of a shape conforming to that of the front side part 21b, and two parallel side parts 34B extending perpendicularly to the base part 34A. Countersunk holes 34b for receiving flat head machine screws 35 are formed in the side parts 34B of the brackets 34. The main part 34A and the two side parts 34B are formed so as to define a space in which the uncoated part of the end part 32b of the assist grip 32, i.e., the end part of the core pipe 33 not coated with the elastic coating member 31, is fitted closely.

In this embodiment, the pair of brackets 34 have the same shape. The base parts 34A of the brackets 34 are put on the front side part 21b with the recesses 34a engaged with the front side part 21b and are welded to the front side part 21b. The brackets 34 are inclined to the front side part 21b in directions in which the end parts 32b of the assist grip 32, respectively.

The uncoated parts of the end parts 32b of the assist grip 32, i.e., the end parts of the core pipe 33 not coated with the elastic coating member 31 are inserted in the brackets 34 and the flat head machine screws 35 are passed through the countersunk holes 34b of the side parts 34B and are screwed in threaded holes formed in the core pipe 33 to fasten the assist grip 32 to the brackets 34. The heads of the flat head machine screws 35 are countersunk in the countersunk holes 34b. In a state where the uncoated parts of the end parts 32b of the assist grip 32 are inserted in the brackets 34, the opposite ends of the elastic coating member 31 are contiguous with the free ends of the brackets 34.

The passenger seated on the passenger seat 4b is able to grasp the assist grip 32 attached to an upper part of the front side part 21b of the front frame member 21 of the cabin frame 5, so that the passenger is able to remain stably seated on the passenger seat 4b even if the four-wheeled utility vehicle jolts along over rough roads, not to mention traveling on paved roads. The passenger seated on the passenger seat 4b is able to support himself by grasping the assist grip 32 when getting off the four-wheeled utility vehicle. Thus the passenger is able to get on and off the four-wheeled vehicle very easily without straining himself.

Thus, the comfortableness of the passenger to ride the four-wheeled utility vehicle and the ease of getting on and off the four-wheeled utility vehicle can be greatly improved simply by adding the assist grip 32 to the four-wheeled utility vehicle provided with the cabin frame 5 having the open front and sides. Since the pair of brackets 34 may be of the same shape, the number of kinds of parts is reduced. The assist grip 32 can be located on the cabin frame 5 by inserting the uncoated parts of the end parts 32b, i.e., the end parts not coated with the elastic coating member 31 of the core pipe 33, of the assist grip 32 in the brackets 34 and fastening the same to the brackets 34 with the flat head machine screws 35. Since the assist grip 32 is detachably attached to the cabin frame 5, the same can be replaced with another one having a desired shape different from that of the assist grip 32. Since the assist grip 32 protrudes toward the passenger seat 4b, the passenger seated on the passenger seat 4b is able to grasp the assist grip 32 by naturally stretching out his hand without stretching out his hand with an effort or without bending the wrist.

Although the invention has been described in its preferred embodiment, the present invention is not limited to the embodiment specifically described herein in its practical application and various modifications are possible. For example, pipes having an inside diameter corresponding to the outside diameter of the end parts of the core pipe 33 of the assist grip 32 may be used instead of the brackets 34 each having the main part 34A and the two side parts 34B. The end parts 32b of the assist grip 32 may extend perpendicularly to the main part 32a of the same instead of extending at an inclination to the main part 32a. The assist grip 32 may be permanently fixed to the front side part 21b on the side of the passenger seat 4b of the front frame member 21 of the cabin frame 5 instead of detachably attaching the same to the front side part 21b of the front frame member 21. The front side part 21b of the front frame member 21 may be either inclined or vertical.

What is claimed is:

1. A four-wheeled utility vehicle comprising:
   a seat including a driver's seat and a passenger seat neighboring to a lateral side of the driver's seat;
   a load-carrying platform behind said seat;
   a cabin frame surrounding said seat and having an open front having no windshield and open lateral sides having no doors and open top having no roof;
   a bonnet openably positioned neighboring to a front part of the seat and in front of the cabin frame; and
   an assist grip to be grasped by a passenger in a state seated on the passenger seat, the assist grip is attached to an upper part of the front side part on the side of the passenger seat of the front frame member so as to protrude toward a passenger in the state seated on the passenger seat such that the passenger in the state seated on the passenger seat is able to grasp the assist grip;
   wherein the cabin frame is formed by assembling pipes, and
   the cabin frame has
   a front frame member set in front of the seat, having front side parts extending substantially vertically on right and left sides in front of the seat, a lower end of the front frame member being mounted on a side of the bonnet, a rear frame member set behind the seat and having rear side parts extending substantially vertically on right and left sides behind the seat, and an upper frame member interconnecting respective upper parts of the front and the rear frame member, wherein the assist grip includes a core pipe of a metal having a main part to be grasped by the passenger and side parts to be attached to the front member so as to expand from opposite ends of the main part, respectively, at a fixed angle to the main part, and an elastic coating member provided on the main part of the core pipe.

2. The four-wheeled utility vehicle according to claim 1, wherein the side parts of the core pipe are fastened to a pair of brackets fixed to the front side part of the front frame member with screws such that the assist grip is detachably attached to the front side part.

3. The four-wheeled utility vehicle according to claim 2, wherein the assist grip includes: a core pipe of a metal having a main part and side parts extending from opposite ends of the main part, respectively, at a fixed angle to the main part, and an elastic coating member coating at least the main part of the core pipe; a pair of brackets are fixed to the front side part of the front frame member of the cabin frame; and the side parts of the core pipe are fastened to the brackets with screws.

4. The four-wheeled utility vehicle according to claim 1, wherein the front frame member has a horizontal, lateral, front upper part and a pair of front side parts extending downward from opposite ends of the front upper part.

5. The four-wheeled utility vehicle according to claim 4, wherein the two front side parts are sloped down toward the front.

6. The four-wheeled utility vehicle according to claim 1, wherein the assist grip is inclined toward the passenger seat at an inclination in the range of 5° to 60° with respect to a vertical plane including a longitudinal axis of the four-wheeled utility vehicle.

7. The four-wheeled utility vehicle according to claim 6, wherein the inclination of the assist grip is 45.

8. The four-wheeled utility vehicle according to claim 1, wherein the front frame member and the rear frame member of the cabin frame have shapes resembling the inverted letter U.

* * * * *